(12) United States Patent
Lan et al.

(10) Patent No.: US 7,020,672 B2
(45) Date of Patent: Mar. 28, 2006

(54) REDUCED COMPLEXITY IDCT DECODING WITH GRACEFUL DEGRADATION

(75) Inventors: Tse-Hua Lan, Ossining, NY (US); Zhun Zhong, Croton on Hudson, NY (US); Yingwei Chen, Briarcliff Manor, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 665 days.

(21) Appl. No.: 09/823,363

(22) Filed: Mar. 30, 2001

(65) Prior Publication Data

US 2002/0161809 A1    Oct. 31, 2002

(51) Int. Cl.
*G06F 17/14* (2006.01)
(52) U.S. Cl. .................................... 708/402
(58) Field of Classification Search ............... 382/232, 382/244, 248; 708/400–405; 375/240.2
See application file for complete search history.

(56) References Cited

U.S. PATENT DOCUMENTS

| | | | | |
|---|---|---|---|---|
| 5,216,516 A | * | 6/1993 | Tanaka et al. ............... | 382/248 |
| 5,379,122 A | * | 1/1995 | Eschbach ..................... | 382/248 |
| 5,881,176 A | * | 3/1999 | Keith et al. .................. | 382/248 |
| 5,883,823 A | * | 3/1999 | Ding ........................... | 708/402 |
| 5,959,673 A | * | 9/1999 | Lee et al. ............... | 375/240.16 |
| 6,167,092 A | * | 12/2000 | Lengwehasatit ............. | 708/402 |
| 6,167,155 A | * | 12/2000 | Kostrzewski et al. ........ | 382/232 |
| 6,295,320 B1 | * | 9/2001 | Lim et al. .................... | 708/402 |
| 6,374,280 B1 | * | 4/2002 | Li ................................ | 708/402 |
| 6,400,680 B1 | * | 6/2002 | Fisch ........................... | 370/210 |
| 6,466,924 B1 | * | 10/2002 | Tateishi et al. ................ | 700/48 |
| 6,587,590 B1 | * | 7/2003 | Pan .............................. | 708/402 |

FOREIGN PATENT DOCUMENTS

EP          1079636 A1    2/2001

OTHER PUBLICATIONS

Eri et al., Fast 2-D IDCT implementation with multimedia instructions for a software MPEG2 decoder, 1998, IEEE, pp. 31053108.*
Lowell Winger, Source adaptive software 2D IDCT with SIMD, 2000, IEEE, pp. 3642-3645.*
John et al., Large block VQ for image sequences, 1999, IEEE Image Processing and its Applications Conference Publication No. 465, pp. 183-187.*

(Continued)

*Primary Examiner*—Wei Zhen
*Assistant Examiner*—Chat C. Do (57) ABSTRACT

Data compressed according to a lossy DCT-based algorithm, such as the MPEG or MPEG2 algorithms, is decompressed according to a dynamically-selected set of DCT coefficients, with unused coefficients masked out. A macroblock of the data exhibiting little motion is decompressed with a small subset of DCT coefficients, while a macroblock exhibiting more motion is decompressed using a larger subset of DCT coefficients up the full set of DCT coefficients. Average computational complexity is thus kept low, enabling the use of inexpensive equipment, while degradation is minimized.

19 Claims, 5 Drawing Sheets

OTHER PUBLICATIONS

Thucydides et al., A low-power IDCT macrocell for MPEG2 MP@ML exploiting data distribution properties for minimal activity, 1998, IEEE Symposium on VLSI circuits Digest of Technical papers, pag s 38-39.*

Hong et al: "An Edge-Preserving Image Interpolation System For A Digital Camcorder" IEEE transactions On Consumer Electronics, IEEE Inc. New York, US, vol. 42, No. 3, Aug. 1, 1996, pp. 279-283.

* cited by examiner

REDUCED COMPLEXITY IDCT DECODING WITH GRACEFUL DEGRADATION

BACKGROUND OF THE INVENTION

1. Field of the Invention

The present invention relates to the decoding of compression algorithms for digital data, and particularly to decoding algorithms employing the Inverse Discrete Cosine Transform.

2. Description of the Related Art

Digital datastreams are often compressed for purposes of storage and transmission. Datastreams containing alphanumeric data are typically required to be absolutely unchanged after compression and decompression, but when working with audio or pictorial data it may be acceptable to use "lossy" compression in which some detail may be lost or altered but in which a human observer perceives the output as substantially similar to the original.

Many lossy compression algorithms have been devised, such as MP3 (Moving Picture Experts Group Layer-3 Audio) for sound recordings, JPEG (Joint Photographic Experts Group) for still pictures, and MPEG (Motion Picture Experts Group) and MPEG2 for video recordings. An embodiment of the invention to be described applies primarily to MPEG2 compression, but is applicable to other algorithms as well.

In MPEG2 compression, a video frame to be transmitted is divided into macroblocks (MB's) of 8×8 pixels. A discrete cosine transform (DCT) is run on the MB, yielding an 8×8 array of coefficients. The coefficients, quantized and perhaps further compressed by Huffman-tree encoding, are stored or transmitted for retrieval by a playback device.

The playback device performs an inverse discrete cosine transform (IDCT) on each 8×8 array of coefficients to reconstruct the equivalent to the 8×8 array of pixels from the original frame. To recover maximum detail and accuracy, all 64 of the coefficients should be processed. (Even if all 64 coefficients are used, there will still be some loss of detail because of the aforementioned quantizing.) For many applications, such as consumer entertainment, a user may be willing to sacrifice some picture quality in order to have a lower-cost playback device. In a prior-art solution, a usable or acceptable level of picture quality is attained using fewer than all 64 of the coefficients, thus permitting the use of a computational element of lesser capability. The number of coefficients used in the inverse DCT is predetermined according to a desired level of quality for a particular computational element. The picture quality can be quite good for homogeneous scenes with little camera movement and little subject movement, but degrades for highly variegated scenes or when there is rapid camera movement or rapid subject movement. Picture degradation may exceed the limits of "graceful" degradation, a term of art indicating that although degradation is permitted, it is managed so as to be as unobtrusive as possible. There is thus a need for an MPEG2 playback system with ability to process fewer than all of the DCT coefficients while maintaining graceful degradation of picture quality.

SUMMARY OF THE INVENTION

To overcome limitations in the prior art described above, and to overcome other limitations that will be apparent upon reading and understanding the present specification, the present invention provides a system and method of dynamically assessing horizontal high frequency components of a DCT block and decoding using a number of DCT coefficients dynamically selected according to current level of high-frequency components.

According to one aspect of the invention, the DCT component representing the highest frequency of DCT components representing horizontal frequency is assessed, and a masking of DCT coefficients is selected accordingly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

In a typical data compression scheme, such as MPEG or MPEG2 data compression of video streams, an 8×8 array of pixels (a macroblock or MB) is extracted from a video frame, and a Discrete Cosine Transform (DCT) is performed on the MB to yield a set of DCT coefficients, which typically are quantized to produce an 8×8 array of DCT coefficients.

The DCT algorithm, well known in the art, is given here for reference. Given data A(i), where i is an integer in the range 0 to N−1, the forward DCT (which would be used, e.g., by an encoder) is:

$$B(k) = [1 - (1 - sqrt(2)/2)\text{delta}(k)]/2 \sum_{i=0 \text{ to } N-1} A(i)\cos((pi\ k/N)(2i+1)/2)$$

B(k) is defined for all values of the frequency-space variable k, but we only care about integer k in the range 0 to N−1. The inverse DCT (which would be used, e.g., by a decoder) is:

$$AA(i) = \sum_{k=0 \text{ to } N-1} B(k)[1 - (1 - sqrt(2)/2)\text{delta}(k)]/2\cos((pi\ k/N)(2i+1)/2)$$

Figure 1:
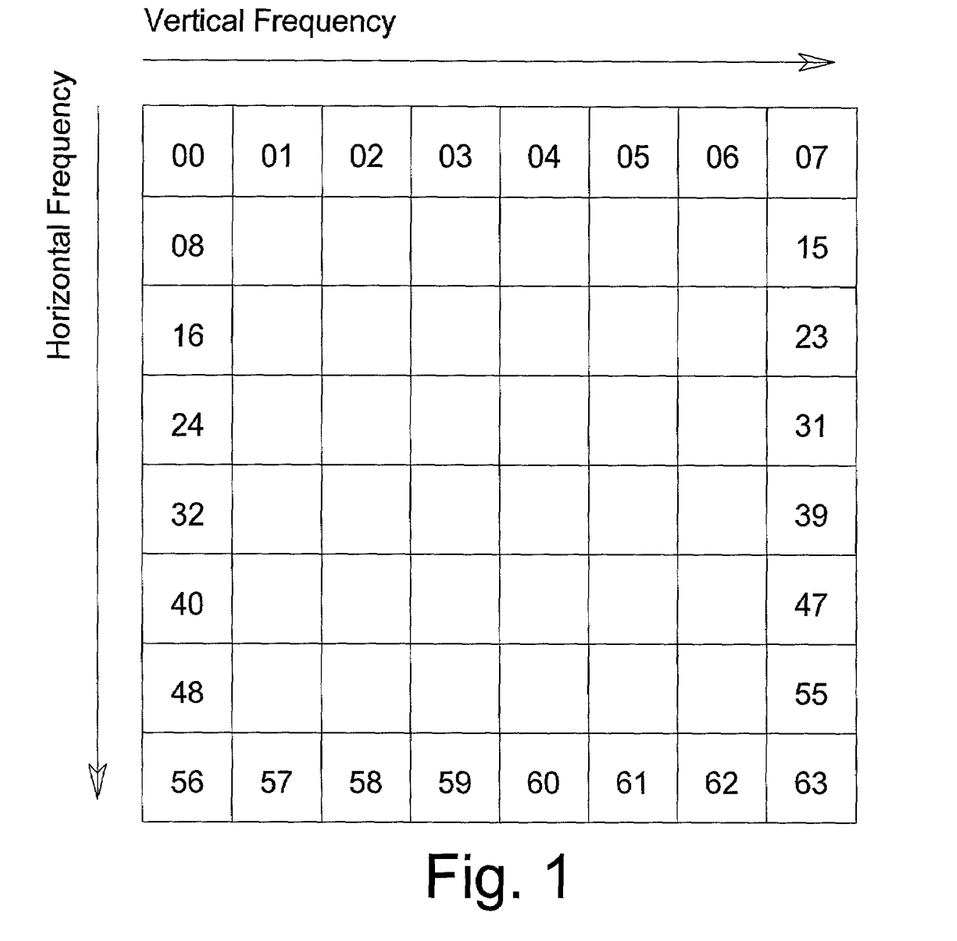
FIG. 1 depicts the organization of DCT coefficient positions in an 8×8 array according to one embodiment of the invention.
Figure 1A:
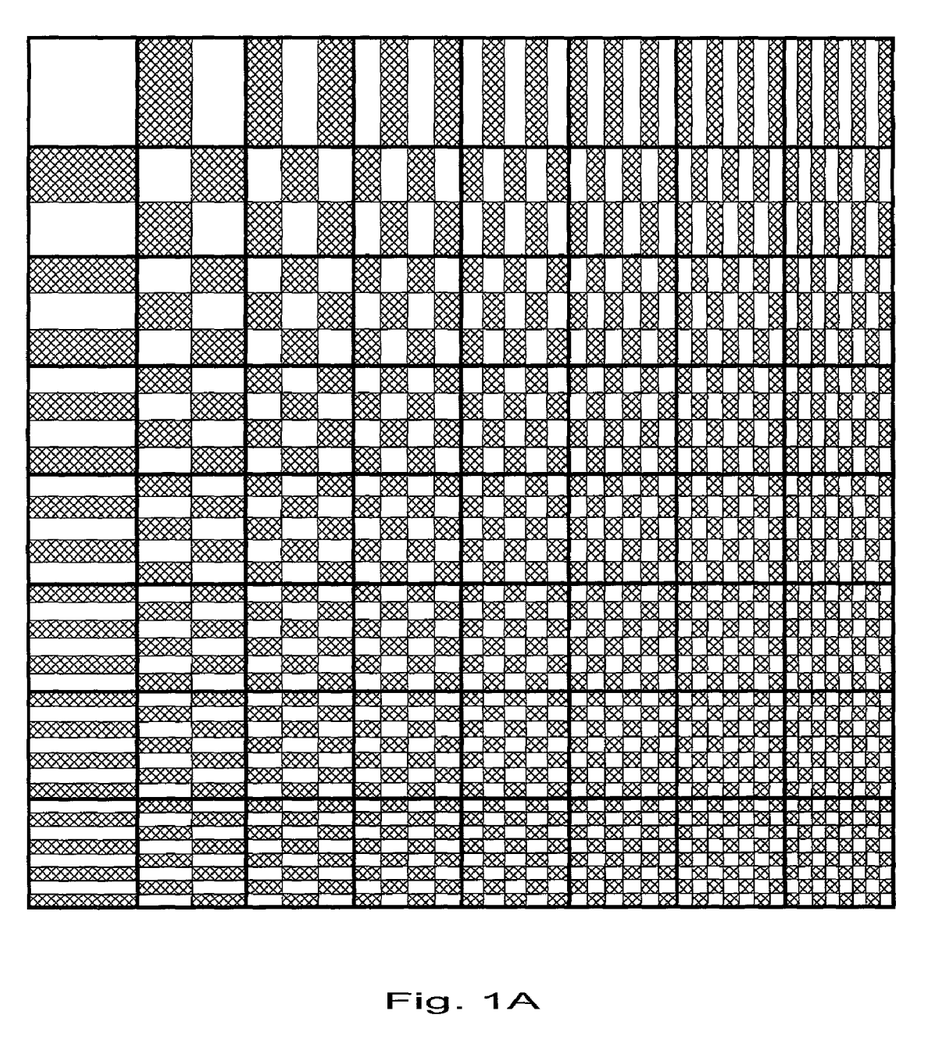
FIG. 1A schematically illustrates relative frequencies represented by the DCT coefficient positions given in FIG. 1.

FIG. 1 shows a typical layout of such an array in which 64 coefficient positions are denominated 00 through 63. In the DCT algorithm as applied to this array, N has a value of 64. Position 00 contains a DCT coefficient representing the lowest vertical frequency in the MB and lowest horizontal frequency in the MB. Coefficients representing higher horizontal frequencies occupy successive positions "down" the array as depicted in FIG. 1, while coefficients representing higher vertical frequencies occupy successive positions "across" the array as depicted. Thus, the coefficient in position 7 represents the highest vertical frequency regardless of horizontal frequency, the coefficient in position 56 represents the highest horizontal frequency regardless of vertical frequency, and the coefficient in position 63 represents both the highest horizontal frequency and the highest vertical frequency. FIG. 1A schematically illustrates the relative frequencies in the array positions.

In order to reproduce the original frame for playback, it is necessary to perform an inverse discrete cosine transform (IDCT) on the 8×8 array of cosine coefficients to recover an approximation of the 8×8 MB from the original frame. It is an approximation because compression algorithms such as MPEG are inherently "lossy" compression algorithms—some detail is inherently lost or altered. However, the loss of detail may be imperceptible to the viewer. Further, it may be possible to increase the loss of detail (in order to simplify, and thus reduce the cost of, playback equipment) while still producing an output video stream that is not objectionable to the viewer.

Figure 2A:
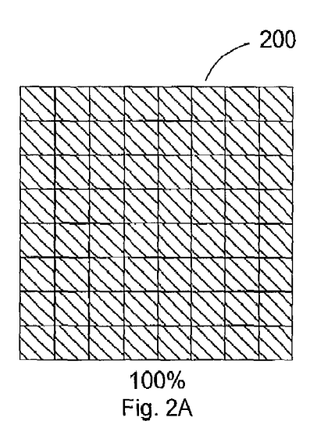
FIGS. 2A through 2H show typical maskings that may be applied to decode a signal coded into DCT coefficients according to FIG. 1, and states the relative computational complexity for each.
Figure 2B:
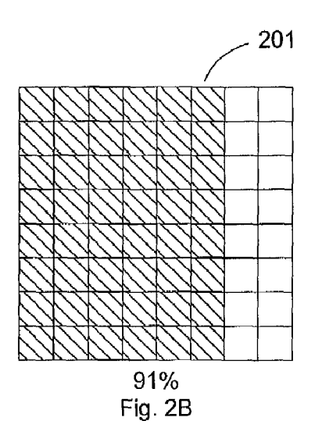

FIG. 2A, by virtue of being completely hatched, denotes that every position of the 8×8 array of DCT coefficients is used in the IDCT decoding. This is 100% of the computation complexity for reconstructing a MB. FIGS. 2B through 2H each show a typical subset of the coefficients 00–63 being used in the IDCT decoding. A hatched square denotes that the corresponding DCT coefficient from the corresponding position identified in FIG. 1 is used in the IDCT decoding. An unhatched square indicates that the corresponding DCT coefficient is set to zero, and is not used. With each of FIGS. 2B through 2H is a relative (i.e., percentage) indication of the resulting computation complexity. The degree to which image quality is degraded by using a subset of the DCT coefficients depends on the frequency complexity of the MBs. An MB that is a portion of a constant flat background, for example, would probably not show perceptible degradation even with the 38% complexity of FIG. 2H. On the other hand, an MB that is a portion of the checked shirt of a man sprinting across the scene from left to right while the camera is panning the scene right to left would appear quite badly degraded with the 38% complexity of FIG. 2H and would be degraded less with each higher level of complexity.

Similar considerations apply to an MB exhibiting high complexity in the vertical orientation, such as the checked shirt of the man should he plummet off a cliff. In typical video program material, horizontal complexity is encountered far more often than vertical. The preferred embodiment of the present invention reduces degradation of horizontal complexity more than vertical, but it is understood that the techniques of the present invention may also be directed toward stressing vertical complexity or to treating horizontal and vertical complexity equally.

A prior-art solution to providing a nominal level of viewing quality on a low-cost playback device that cannot continuously provide 100% computation capability is to always decode using one predetermined subset of DCT coefficients, selected according to the computational capabilities of the playback device. For example, for a playback device based on a 100 MHz Intel Pentium chip, the 55% complexity of FIG. 2G might always be used, but for a playback device based on a 350 MHz Intel Pentium-II chip the 86% complexity of FIG. 2C might always be used. The latter device would produce better results, but even at that it might produce results with noticeable and obtrusive degradation for MBs with a high degree of horizontal complexity.

The present invention assesses the horizontal complexity of each individual MB, and selects the complexity level accordingly. Thus, in the example of the man with a checked shirt sprinting through the scene, high-complexity decoding is used for MBs from the checked shirt or other portions of the rapidly moving man so as to reduce degradation. But other MBs from the frame typically exhibit much lower complexity (the background behind the sprinting man might be a uniform building wall or a uniform blue sky), and low-complexity decoding could be used for those MBs without introducing objectionable degradation.

Referring again to FIG. 1, the magnitude of coefficient 56 is indicative of the horizontal complexity of the current MB at the highest horizontal frequency, and thus coefficient 56 is used as a bellwether to select the complexity of processing to be applied for the current MB. This selection is of great importance if the video data is interleaved (which is the case for most TV signals). The case where the data is interleaved and DCT coded after interleaving is known as frame-type DCT (as opposed to field-type DCT, performed on uninterleaved MBs). In interleaved data, a top field may be very different from a bottom field, in which case coefficient 56 will have a very high value. The prior-art solution of blindly using a fixed decoding complexity tends to result in objectionable degradation in such cases. Viewers have reported becoming dizzy from viewing such output. High vertical complexity tends to occur much less often in typical program material. (Other embodiments might use coefficient 63 (or some other coefficient along the main diagonal of the array) if it were desired to minimize horizontal and vertical degradation equally, or coefficient 07 might be used if it were desired to minimize only vertical degradation.)

Figure 2C:
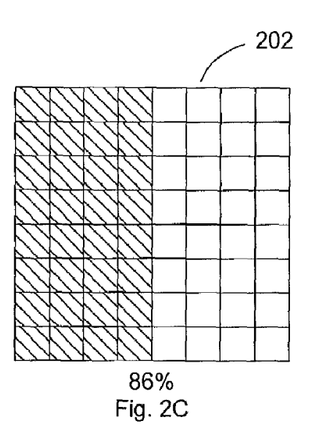
Figure 2D:
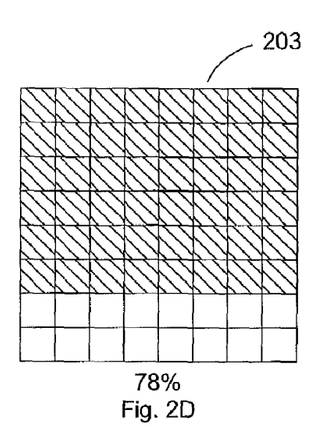
Figure 2E:
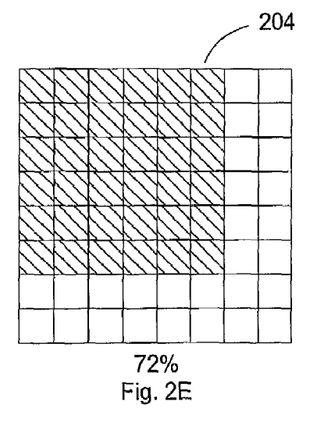
Figure 2F:
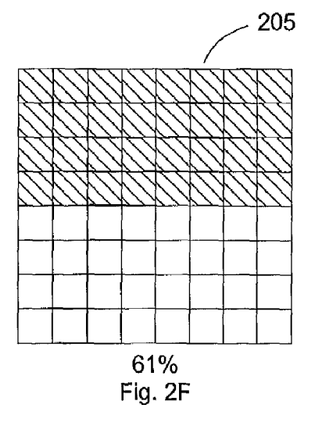
Figure 2G:
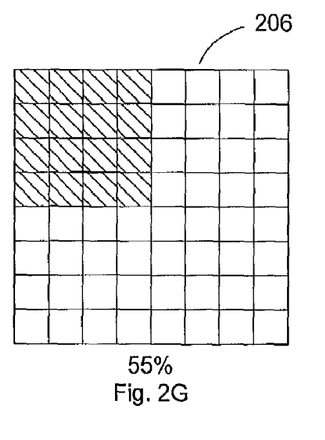
Figure 2H:
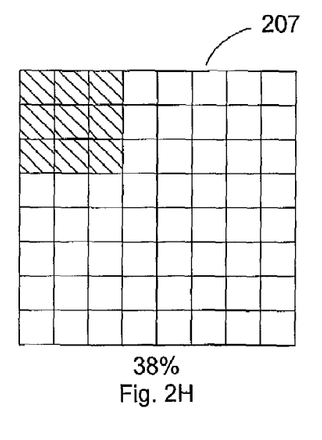

For MBs having low horizontal complexity (from a uniform background, for example) the magnitude of coefficient 56 is very low, and the low-complexity encoding of FIG. 2H could accordingly used to decode the MB without introducing significant degradation. Higher levels of complexity of encoding are used for higher values of coefficient 56, thus keeping degradation down to acceptable values. For MBs for which coefficient 56 exceeds a predetermined threshold value, the 100% complexity of FIG. 2A in which all 64 DCT coefficients are used, could be employed. For virtually all typical frames, the average computational complexity is well below 100%, even if 100% complexity decoding is used for some of the MBs comprising the frame.

In a present embodiment of the invention, only one threshold value for coefficient 56 is defined; for values below the threshold, the coefficient subset depicted in FIG. 2G, with 55% relative complexity, is employed; for values at or above the threshold, the coefficient subset depicted in FIG. 2C, with 86% relative complexity, is employed.

Figure 3:
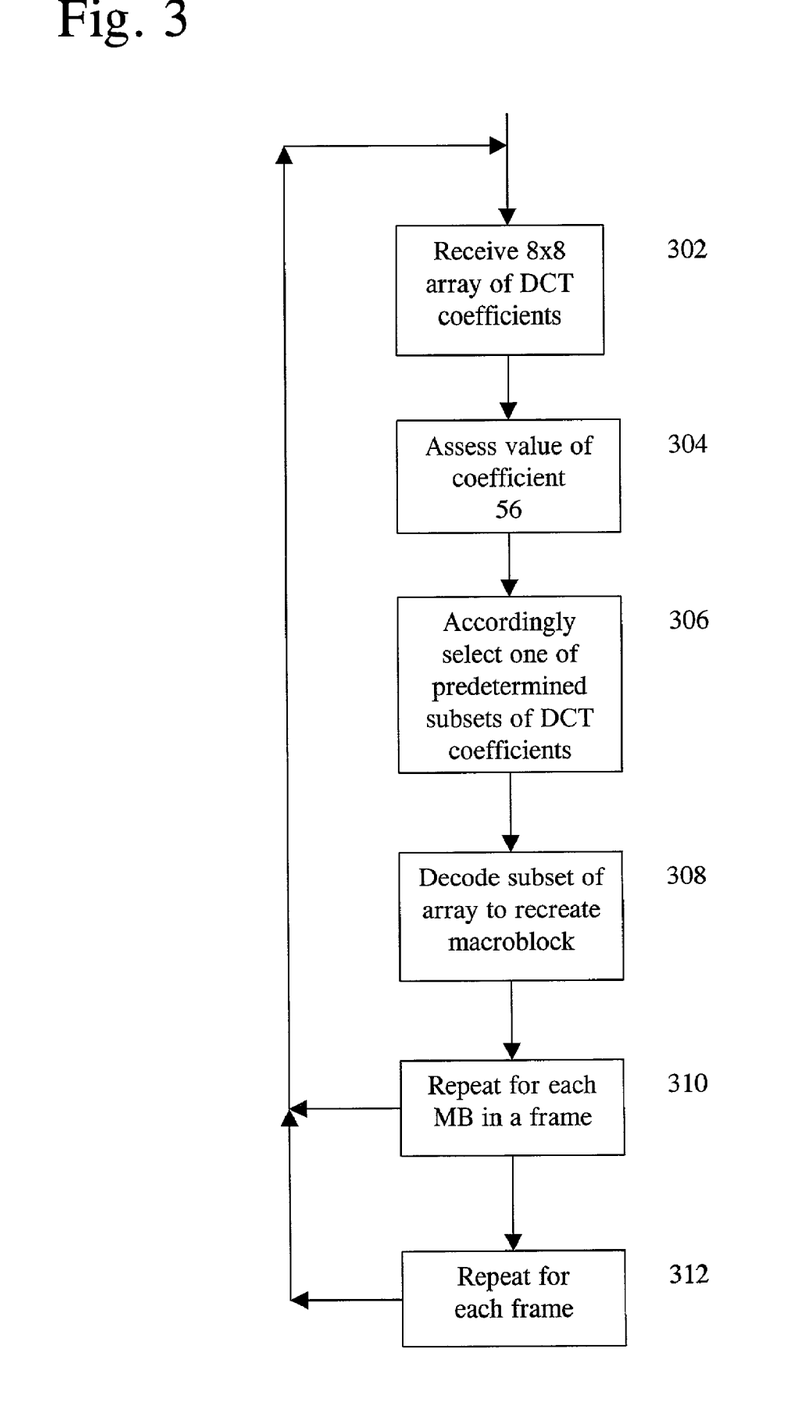
FIG. 3 is a flow chart for an embodiment of the invention.

An embodiment of the invention is described in flowchart form in FIG. 3. For each MB of each frame, an 8×8 array of DCT coefficients is received (block 302), typically from a storage means or a transmission means. In block 304, the value of coefficient 56 is assessed. As discussed supra, coefficient 56 is associated with the highest frequency of horizontal motion, and the present embodiment seeks to minimize horizontal degradation while permitting vertical degradation since vertical degradation occurs much less frequently in typical program material.

In block 306, according to a predetermined association of the maskings for subsets of DCT coefficients (FIG. 2) with the value of coefficient 56, a predetermined one of the maskings is selected. In block 308 the selected subset of DCT coefficients is used in an inverse-DCT operation to recover an approximation of the original macroblock. With the dynamic selection of coefficient subsets according to the value of coefficient 56, lower complexity is used when there is not much horizontal motion, and higher complexity is used to minimize degradation for various greater amounts of horizontal motion. A present embodiment employs one of two subset selections: the 55% complexity subset of FIG. 2C for values of coefficient 56 below a predetermined threshold, and the 86% complexity subset of FIG. 2G for values at or above the predetermined threshold.

Block 310 dispatches back to block 302 so that each MB of a frame is processed. Block 312 dispatches back to block 302 to process each frame in a video stream.

Figure 4:
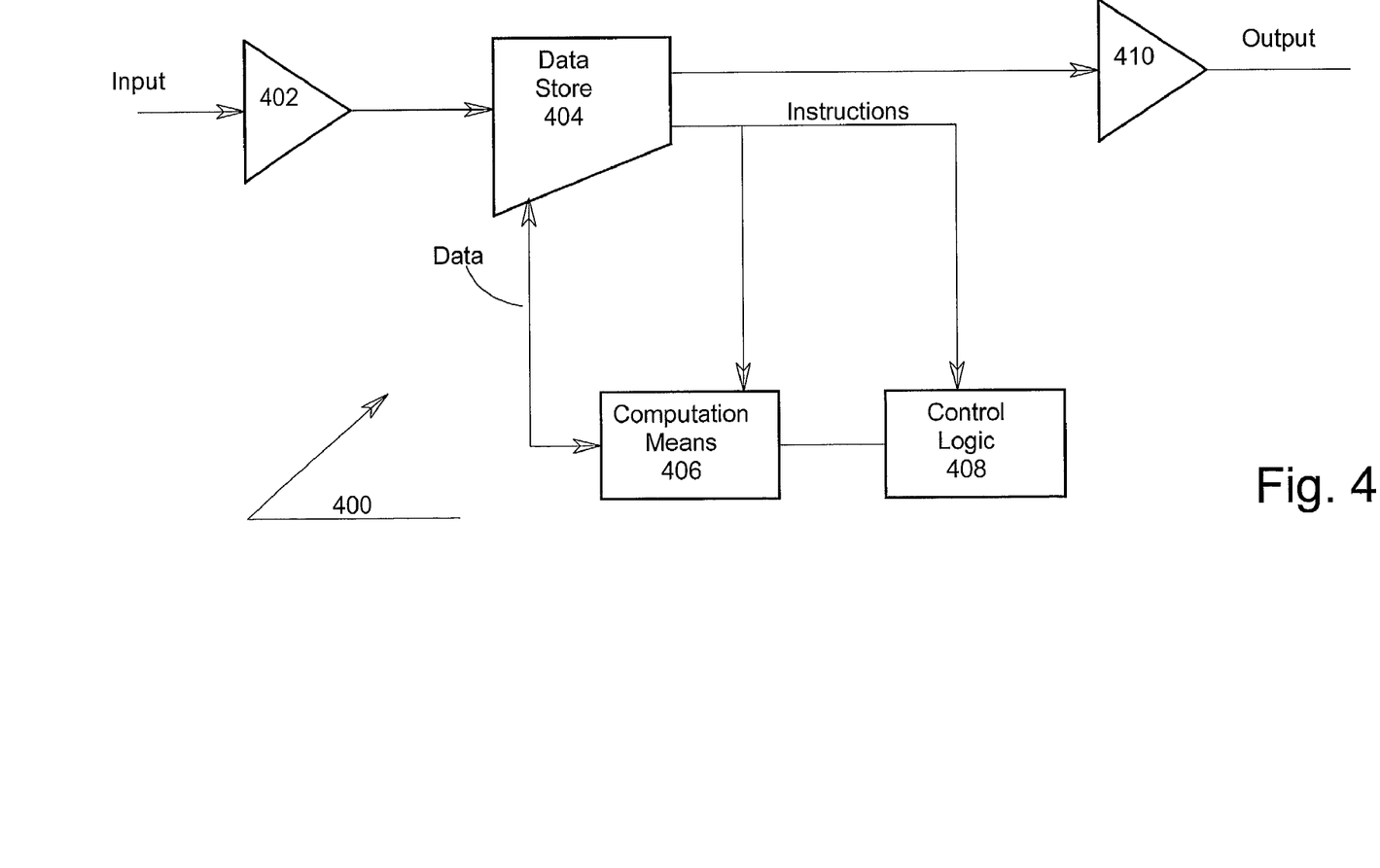
FIG. 4 is a block diagram of an apparatus suitable for executing the flow of FIG. 3.

Apparatus for carrying out the operations described herein may, as a matter of design choice, be constructed in special-purpose hardware, or in general-purpose digital logic hardware programmed by appropriate firmware or software. Such an apparatus 400 is block-diagrammed in FIG. 4. It contains a data receiver 402 for receiving input data; a data store 404 for storing computer instructions and data (input data, intermediate data, processed output data, and working data such as the predetermined DCT subsets); a computation means 406; control logic 408; and a data transmitter 410 for outputting data.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of decoding a video signal, the method comprising: receiving an array of Discrete Coefficient Transform (DCT) coefficients, said DCT coefficient array having been obtained by performing the DCT algorithm on a macroblock (MB), said macroblock being an array of pixels in a video frame, wherein said DCT coefficient array corresponds to said MB; determining at least one of the horizontal complexity and the vertical complexity of said MB by determining the value of a predetermined one of the coefficients, wherein said predetermined coefficient represents the highest at least one of horizontal frequency and vertical frequency; and performing inverse DCT (IDCT) coding on a sub-array of coefficients within the DCT coefficient array in order to reconstruct said macroblock, wherein the size and position of said sub-array depends on the determined value of the predetermened one of the coefficients having the highest of at least one of horizontal frequency, and wherein the location of the predetermined one of the coefficients is predetermined.

2. The method according to claim 1, wherein the video signal is video data encoded according to the MPEG algorithm.

3. The method according to claim 1, wherein the video signal is video data encoded according to the MPEG2 algorithm.

4. The method according to claim 1, wherein the predetermined coefficient represents the highest horizontal frequency in the MB regardless of vertical frequency.

5. The method according to claim 4, wherein the predetermined coefficient represents the lowest vertical frequency in the MB.

6. The method according to claim 1, wherein the predetermined coefficient represents the highest vertical frequency in the MB regardless of horizontal frequency.

7. The method according to claim 1, wherein the predetermined coefficient represents the highest horizontal frequency and the highest vertical frequency in the MB.

8. The method according to claim 1, wherein:
the sub-array of coefficients on which IDCT-coding is performed is comprised of one of two sub-arrays:
a first sub-array consisting of one quarter of the DCT coefficients in the DCT coefficient array, the coefficients in said one quarter having horizontal frequencies and lower vertical frequencies than the rest of the coefficients in the DCT coefficient array; and
a second sub-array consisting of one half of the DCT coefficients in the DCT coefficient array, the coefficients having lower vertical frequencies than the rest of the coefficients in the DCT coefficient array;
IDCT coding is performed on the first sub-array if the value of the predetermined coefficient is below a predetermined threshold; and
IDCT coding performed on the second sub-array if the value of the predetermined coefficient is equal to or greater than the predetermined threshold.

9. The method according to claim 1 wherein the entire array of DCT coefficients is not scanned prior to determining the value of the predetermined one of the coefficients.

10. A system for decoding a video signal, the system comprising: receiver for receiving an array of Discrete Coefficient Transform (DCT) coefficients, said DCT coefficient array having been obtained by performing the DCT algorithm on a macroblock (MB), said macroblock being an array of pixels in a video frame, wherein said DCT coefficient array corresponds to said MB; and a processing means for: determining at least one of the horizontal complexity and the vertical complexity of said MB by determining the value of a predetermined one of the coefficients, wherein said predetermined coefficient represents the highest of at least one of horizontal frequency and vertical frequency; and performing inverse DCT (IDCT) coding on a sub-array of coefficients within the DCT coefficient array in order to reconstruct said macroblock, wherein the size and position of said sub-array depends on the determined value of the predetermined one of the coefficients having the highest of at least one of horizontal frequency or vertical frequency, and wherein the location of the predetermined one of the coefficients is predetermined.

11. The system according to claim 10, wherein the video signal is video data encoded according to the MPEG algorithm.

12. The system according to claim 10, wherein the video signal is video data encoded according to the MPEG2 algorithm.

13. The system according to claim 10, wherein the predetermined coefficient represents the highest horizontal frequency in the MB regardless of vertical frequency.

14. The system according to claim 13, wherein the predetermined coefficient represents the lowest vertical frequency in the MB.

15. The system according to claim 10, wherein the predetermined coefficient represents the highest vertical frequency in the MB regardless of horizontal frequency.

16. The system according to claim 10, wherein the predetermined coefficient represents the highest horizontal frequency and the highest vertical frequency in the MB.

17. The system according to claim 10, wherein:
the sub-array of coefficients on which ITDCT-coding is performed is composed of one of two sub-arrays:
a first sub-array consisting of one quarter of the DCT coefficients in the DCT coefficient array, the coefficients in said one quarter having lower horizontal frequencies and lower vertical frequencies than the rest of the coefficients in the DCT coefficient array; and a second sub-array consisting of one half of the DCT coefficients in the DOT coefficient array, the coefficients in said one half having lower vertical frequencies than the rest of coefficients in the DCT coefficient array;

the processing means performs IDCT-coding on the first sub-array if the value of the predetermined coefficient is below a predetermined threshold; and the processing means performs IDCT-coding on the second sub-array if the value of the predetermined coefficient is equal to or greater than the predetermined threshold.

18. The system according to claim 10, wherein the processing means is implemented in at least one of hardware, firmware, and software.

19. The system according to claim 10 wherein the entire array of DCT coefficients is not scanned prior to determining the value of the predetermined one of the coefficients.

* * * * *